2,976,321
PARA-TERTIARY-BUTYLHYDROCINNAMIC ALDEHYDE

Julian Dorsky, Rockaway, and William M. Easter, Jr., Hasbrouck Heights, N.J., assignors to The Givaudan Corporation, New York, N.Y., a corporation of New Jersey No Drawing. Filed June 18, 1959, Ser. No. 821,104

1 Claim. (Cl. 260—599)

This invention relates to a novel aromatic material and more especially to para-tertiary-butylhydrocinnamic aldehyde.

The novel material of this invention has a very strong and persistent green-lily odor. It has surprisingly better strength, lift and intensity than superior materials closely related to it in chemical structure. In this connection, for example, the novel material of this invention has unexpectedly been found to be about four times as strong, in reference to its muguet or lily character, as alpha-methyl-para-tertiary-butylhydrocinnamic aldehyde. In addition, toxicity tests with *Aspergillus niger* showed that even in low concentrations such as 100 parts per million the novel material of this invention completely inhibited the growth of the test organisms. By comparison, a concentration one hundred times as great of the aforementioned alpha-methyl homologue permitted the organisms to grow in a comparison test.

The novel compound of this invention was prepared in accordance with the following example.

EXAMPLE I

*Preparation of para-tertiary-butylhydrocinnamic aldehyde*

A solution of acetaldehyde (44 g.) and methanol (88 g.) was added to methanol (300 g.), p-tert.-butylbenzaldehyde (788 g.) (neutralized), and 30% aqueous NaOH (6 g.) in 2 hours at 25° C. The mixture was agitated an additional 3 hours at 28° C. It was acidified with acetic acid, the solvent removed and washed neutral.

Distillation yielded 626 grams of recovered p-tertiary-butylbenzaldehyde; 136 grams of para-tertiary-butylcinnamic aldehyde, having a melting point of 63°–64° C. and boiling at 130°–134° C. under a pressure of 2.5 mm. of mercury; and a residue of 44 grams.

Para-tertiary-butylcinnamic aldehyde (108 grams) made as noted was hydrogenated with 2 grams of palladium on carbon at 100° C. and 300–400 pounds per square inch, in a rocking autoclave. Distillation of the filtered product yielded 84 grams of p-tertiary-butylhydrocinnamic aldehyde, as a colorless liquid with the following physical proportion:

| | |
|---|---|
| Boiling point | 109°–113° C. (2.0–2.5 mm. of Hg). |
| $n_D^{20}$ | 1.5108–1.5113. |
| Sp. gr. (25° C./25° C.) | 0.9615. |

The olfactory and fungicidal characteristics of this novel material were as aforementioned. It may be used in perfume compositions, for example, those used for soap, cosmetic creams and lotions, and floral perfumes such as those of the muguet or lily, rose, lilac, sweet pea, etc. type.

The following illustrative examples show specific compositions embodying the use of the novel compound of this invention. All parts are by weight.

EXAMPLE II

A lily base formulation was made by mixing together the following ingredients, in the proportions indicated:

| | |
|---|---:|
| Ethyl alcohol | 20 |
| Para cresyl phenyl acetate | 40 |
| Benzyl acetate | 10 |
| Benzyl salicylate | 5 |
| Oil bergamot Messina | 100 |
| Amyl cinnamic aldehyde (Buxine) | 50 |
| Citronellol | 100 |
| Alpha-ionone | 5 |
| Jasmin, absolute | 10 |
| Hydroxycitronellal | 270 |
| Linalool | 150 |
| Oil neroli Bigarade | 10 |
| Phenyl ethyl isobutyrate | 10 |
| Phenyl ethyl salicylate | 50 |
| Phenyl propyl alcohol | 30 |
| Rhodinol | 10 |
| Terpineol | 100 |
| Tuberose, absolute | 10 |
| Oil ylang, Bourbon extra | 20 |
| | 1000 |

Amounts of para-tertiary-butyl-alpha-methyl-hydrocinnamic aldehyde and the novel chemical of this invention, i.e., para-tertiary-butyl-hydrocinnamic aldehyde, ranging from 0.25% to 2% of the above lily base composition were combined with the lily base formulation prepared as indicated above. It was found that 4 times as much of the p-tert.-butyl-alpha-methyl-hydrocinnamic aldehyde was required to give odor value comparable to that obtained with the herein-disclosed novel compound. In other words, the composition containing 1% of the former aldehyde was the equivalent in lily character to that which contained only 0.25% of the novel aldehyde of this invention. Also, the formulations containing the latter aldehyde had a more natural odor than did the other formulations.

The two aldehydes which were compared in Example II in connection with a lily or muguet formulation, were also compared in typical lilac and floral bouquet perfumes by adding varying amounts, from 1 to 2%, to said perfumes. In the case of lilac perfumes, the novel aldehyde of this invention imparted improved greeness, freshness, floralcy and persistency than did the other aldehyde tested. In the case of the floral bouquet perfume, the novel aldehyde exhibited much greater strength and intensity than did p-tert.-butyl-alpha-methyl-hydrocinnamic aldehyde.

In using the novel aldehyde of this invention in soap perfumes, it has been found that amounts from about 0.1% to about 25%, by weight, of the novel perfume ingredient of this invention can be used. The resulting soap perfumes, when incorporated into toilet soap, impart pleasing and fragrant odors and exhibit excellent odor stability in exposure tests.

The foregoing illustrates the practice of this invention which however is not to be limited thereby but is to be construed as broadly as permissible in view of the prior art and limited solely by the appended claim.

We claim:
Para-tertiary-butylhydrocinnamic aldehyde.

References Cited in the file of this patent
UNITED STATES PATENTS

| | | |
|---|---|---|
| 2,242,322 | Poizat | May 20, 1941 |
| 2,875,131 | Carpenter et al. | Feb. 24, 1959 |

OTHER REFERENCES

Bert.: Comptes rendus, vol. 186 (1928), pp. 699–700.